United States Patent [19]
Matsumoto et al.

[11] Patent Number: 6,144,339
[45] Date of Patent: Nov. 7, 2000

[54] ARRAY ANTENNA

[75] Inventors: Kunio Matsumoto; Tsugio Yamazaki, both of Tokyo, Japan

[73] Assignee: NEC Corporation, Tokyo, Japan

[21] Appl. No.: 09/364,510

[22] Filed: Jul. 30, 1999

[30] Foreign Application Priority Data

Jul. 31, 1998 [JP] Japan .................................. 10-218103

[51] Int. Cl.$^7$ .......................... H01Q 21/06; H01Q 21/24; H04B 7/10
[52] U.S. Cl. .......................................................... 342/361
[58] Field of Search .............................................. 342/361

[56] References Cited

U.S. PATENT DOCUMENTS

| | | | |
|---|---|---|---|
| 5,270,719 | 12/1993 | Roth | 342/361 |
| 5,539,413 | 7/1996 | Farrell et al. | 342/361 |

FOREIGN PATENT DOCUMENTS

| | | |
|---|---|---|
| 7-321537 | 12/1995 | Japan . |
| 9-153721 | 6/1997 | Japan . |
| 9-162628 | 6/1997 | Japan . |

*Primary Examiner*—Theodore M. Blum
*Attorney, Agent, or Firm*—Ostrolenk, Faber, Gerb & Soffen, LLP

[57] ABSTRACT

An array antenna for use in, e.g., a radar includes a plurality of pairs of vertical polarization antenna elements and horizontal polarization antenna elements. A particular transmission/receipt module is connected to each pair of vertical and horizontal polarization antenna elements. A beam controller forms a transmission/receipt digital beam while a local signal generator controls a transmission/receipt frequency. The beam controller is connected to the transmission/receipt modules via a data bus and I/O (Input/Output) sections included in the modules.

5 Claims, 14 Drawing Sheets

Fig. 3  PRIOR ART

| POLARIZATION | PHASE SHIFT φEL OF MODULE CONNECTED TO VERTICAL POLARIZATION ANTENNA | PHASE SHIFT φEL OF MODULE CONNECTED TO HORIZONTAL POLARIZATION ANTENNA |
|---|---|---|
| VERTICAL LINEAR POLARIZATION | 0° | OPEN TO CHOICE; TRANSMISSION OFF |
| HORIZONTAL LINEAR POLARIZATION | 0° | 0° |
| +45° LINEAR POLARIZATION | 0° | 0° |
| −45° LINEAR POLARIZATION | 0° | −180° |
| RIGHT HAND CIRCULAR POLARIZATION | 90° | 0° |
| LEFT HAND CIRCULAR POLARIZATION | 0° | 90° |

204 (+45° POLARIZATION PLANE)

207 (-45° POLARIZATION PLANE)

Fig. 8

| POLARIZATION | CONTROL WEIGHT FOR VERTICAL POLARIZATION ANTENNA (TWmVPn,RWk,mVPn) | CONTROL WEIGHT FOR HORIZONTAL POLARIZATION ANTENNA (TWmHPn,RWk,mHPn) |
|---|---|---|
| VERTICAL LINEAR POLARIZATION | $e^{j0}$ | 0 |
| HORIZONTAL LINEAR POLARIZATION | 0 | $e^{j0}$ |
| +45° LINEAR POLARIZATION | $e^{j0}$ | $e^{j0}$ |
| −45° LINEAR POLARIZATION | $e^{j0}$ | $e^{j180}$ |
| RIGHT HAND CIRCULAR POLARIZATION | $e^{j90}$ | $e^{j0}$ |
| LEFT HAND CIRCULAR POLARIZATION | $e^{j0}$ | $e^{j90}$ |

Fig. 9

| TRANSMISSION AMPLITUDE | CONTENTS OF SWITCH CONTROL DATA SmVn,SmHn | | | NUMBER OF POWER AMPS USED DURING TRANSMISSION |
|---|---|---|---|---|
| | 16-1<br>16-4 | 16-2<br>16-5 | 16-3<br>16-6 | |
| GREAT | b | ON | b | 3 |
| MEDIUM | b | OFF | b | 2 |
| SMALL | a | ON OR OFF | a | 1 |
| 0 | a | ON OR OFF | b | 0 |

$$\begin{cases} TWmV1{\sim}n = RWmV1{\sim}n \\ TWmH1{\sim}n = RWmH1{\sim}n \\ TWmVO1{\sim}n \neq TWmHO1{\sim}n \end{cases}$$

$$\begin{cases} TWmVO1{\sim}n = RW1{\sim}k, mVO1{\sim}n \\ TWmHO1{\sim}n = RW1{\sim}k, mHO1{\sim}n \\ TWmVO1{\sim}n = TWmHO1{\sim}n \end{cases}$$

ARRAY ANTENNA

BACKGROUND OF THE INVENTION

The present invention relates to an array antenna for use in, e.g., a radar and more particularly to an array antenna capable of effecting transmission/receipt digital beam formation (DBF) and control over transmission/receipt digital polarization.

It is a common practice with an array antenna to effect transmission beam scanning and polarization control by adequately setting the amounts of phase shift of phase shifters arranged in transmission/receipt modules. It is also possible with the conventional array antenna to form receipt beams based on the combinations of a plurality of different polarization weights and a basic weight, i.e., multibeams of various polarizations.

However, a problem with the conventional array antenna is that control over beam formation during transmission is limited and prevents multiple functions available with receipt DBF, e.g., a receipt multibeam, a shaped beam and polarization control from being made most of. Specifically, during transmission, the phases of the antenna elements are limited by the minimum amounts of phase shift available with digital phase shifters. This, coupled with the fact that an amplitude must be set relying only on the ON/OFF state of module-by-module transmission. It is therefore difficult to form a desired transmission beam.

Another problem is that the number of beams which can be formed at the same time during receipt is limited to the number of complex product sum calculators available. This is because each complex product sum calculator have a single receipt output port.

Technologies relating to the present invention are disclosed in, e.g., Japanese Patent Laid-Open Publication Nos. 7-321537, 9-153721 and 9-162628.

SUMMARY OF THE INVENTION

It is therefore an object of the present invention to provide an array antenna capable of enhancing the freedom of transmission beam formation and increasing the number of beams to be formed at the same time during receipt.

In accordance with the present invention, an array antenna includes a plurality of antenna elements for generating orthogonal polarizations, a plurality of transmission/receipt modules each being assigned to particular one of the antenna elements for forming a transmission/receipt digital beam, and a transmission amplitude circuit for controlling the transmission amplitudes of the antenna elements.

Also, in accordance with the present invention, an array antenna includes a plurality of antenna elements for generating orthogonal polarizations, a plurality of transmission/receipt modules each being assigned to particular one of the antenna elements for forming a transmission/receipt digital beam, and a receipt signal outputting circuit for outputting, based on a receipt digital beam produced by each of the transmission/receipt modules, receipt signals corresponding to each of the orthogonal polarizations and a composite polarization thereof.

Further, in accordance with the present invention, an array antenna includes a plurality of antenna elements for generating orthogonal polarizations. A plurality of transmission/receipt circuits each are connected to the antenna elements and include a digital-to-analog converter and an analog-to-digital converter in a transmitting section and a receiving section, respectively. A digital I/O (Input/Output) section inputs or outputs a transmission/receipt digital signal for forming a transmission/receipt digital beam to or from the transmission/receipt circuits. A transmission/receipt module consists of the digital I/O section and transmission/receipt circuits. A beam controller is connected to the transmission/receipt module via a data bus for generating digital data for forming a desired transmission beam and for forming a plurality of receipt beams at the same time with a complex product sum calculator which is used to form a received digital beam. A transmission amplitude control circuit controls the transmission amplitudes of the antenna elements.

BRIEF DESCRIPTION OF THE DRAWINGS

The above and other objects, features and advantages of the present invention will become more apparent from the following detailed description taken with the accompanying drawings in which:

FIG. 3 is a table listing a relation between typical polarizations and the amounts of phase shift of the transmission/receipt module;

FIG. 8 is a table representative of polarization control particular to the illustrative embodiment;

FIG. 9 is a table demonstrating transmission amplitude control effected by switching in the illustrative embodiment;

DESCRIPTION OF THE PREFERRED EMBODIMENTS

To better understand the present invention, brief reference will be made to a conventional array antenna, shown in FIG. 1. As shown, the array antenna includes antennas 101-1 through 101-n. The antenna 101-1 is made up of a vertical polarization antenna element 102-1 and a horizontal polarization antenna element 103-1. Likewise, the other antennas 101-2 through 101-n are respectively made up of vertical polarization antenna elements 102-2 through 102-n and horizontal polarization antenna elements 103-2 through 103-n. Transmission/receipt modules 104-1 and 104-2 are connected to the antenna elements 102-1 and 103-1, respectively. Transmission/receipt modules 104-3 through 104

(2n-1) and transmission/receipt modules 104-4 through 104-2n are respectively connected to the antenna elements 102-2 through 102-n and antenna elements 103-2 through 103-n. The transmission/receipt modules 104-1 through 104-2n each have a transmitting and receiving function.

A microwave power distributor 105 is connected to the transmitting sections of the transmission/receipt modules 104-1 through 104-2n. Complex product sum calculators 108-1 through 108-m and weight memories 107-1 through 107-m are connected to the receiving sections of the transmission/receipt modules 104-1 through 104-2n for forming a plurality of digital beams of different polarizations. The complex product sum calculator 108-1 includes complex integrators 109-1 through 109-2n and complex adders 110-1 through 110-(2n-1). The other complex product sum calculators 18-2 through 108-m are identical in configuration with the calculator 108-1 although not shown specifically. The calculators 108-1 through 108-m have output terminals 111-1 through 111-m, respectively.

Figure 2:
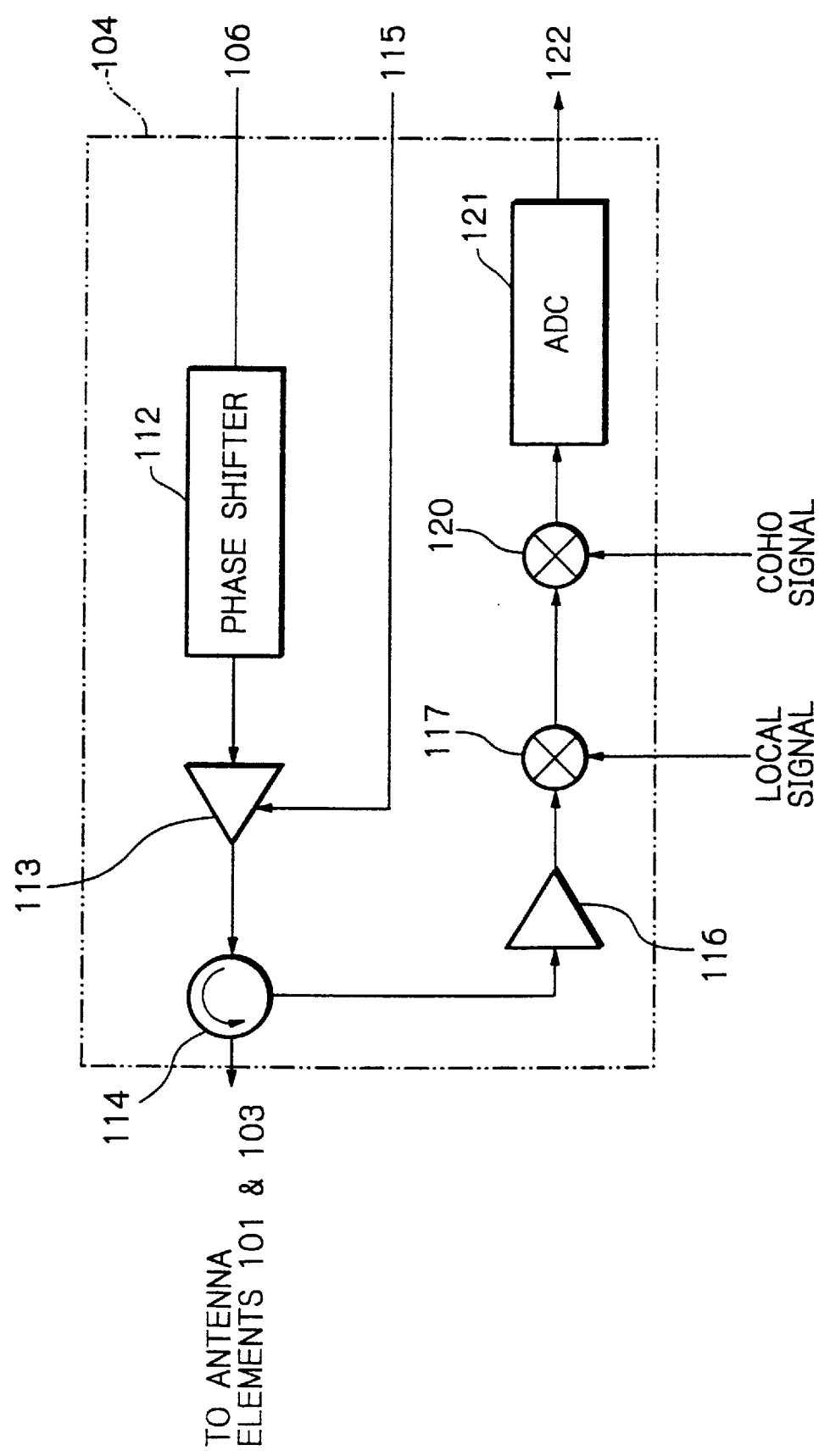
FIG. 2 is a schematic block diagram showing a transmission/receipt module included in the conventional array antenna.

As shown in FIG. 2, each transmission/receipt module, labeled 104, has a transmitting section made up of a phase shifter 112 and a power amplifier 113, a receiving section made up of a low noise amplifier 116, mixers 117 and 120 and an analog-to-digital converter (ADC) 121, and a circulator 114 for switching transmission and receipt.

The operation of the above array antenna will be described with reference to FIGS. 1 and 2. During transmission, a drive signal 106 is distributed to the transmission/receipt modules 104-1 through 104-2n via the microwave power distributor 105. In each of the modules 104-1 through 104-2n, the drive signal 106 is adjusted in phase by the phase shifter 112, then amplified by the power amplifier 113, and then fed to the circulator 114. The resulting output of the circulator 114 is radiated to the space via associated one of the vertical polarization antenna elements 102-n through 102-n or horizontal polarization antenna elements 103-1 through 103-n.

By adjusting the amount of phase shift of the phase shifter 112, it is possible to control the profile and polarization of the beam to be transmitted. For example, in the case of beam scanning, assume that the beam scanning angle is θ. Then, for each of the antenna elements 102-1 through 102-n and antenna elements 103-1 through 103-n, the basic amount φN of phase shift of the phase shifter 112 is generally expressed as:

$$\phi N = (N-1) \cdot 360 \cdot d/\lambda \cdot \sin\theta \qquad \text{Eq. (1)}$$

where N denotes a number assigned to the antenna element (1 through n), d denotes a distance between the antenna elements, and λ denotes a natural space wavelength.

Usually, a phased array antenna uses digital phase shifters each having about five bits. With a 5-bit phase shifter, it is possible to set an amount of phase shift on an 11.25° basis. An amount of phase shift closest to desired one is selected.

Further, to effect polarization control, an amount of shift corresponding to a desired polarization is added to the basic amount of phase shift φN of each of the transmission/receipt modules 104-1 through 104-2n. FIG. 3 tabulates a relation between typical polarizations, additional amounts of phase shift φEL of the transmission/receipt modules for the vertical polarization antenna elements used to transmit the polarizations, and additional amounts of phase shift φAZ of the transmission/receipt modules for the horizontal polarization antenna elements.

How each polarization listed in FIG. 3 is generated will be described hereinafter. To generate a vertical polarization, transmission via the horizontal polarization antenna is turned off. Specifically, an ON/OFF signal 115, FIG. 2, input to the power amplifier 113 of each transmission/receipt module for the horizontal polarization antenna element is held in its OFF state, so that only the vertical polarization antenna element is driven. Conversely, to generate a horizontal polarization, only the horizontal polarization antenna element is driven with the transmission via the vertical polarization antenna element being held in the OFF state.

Figure 4A:
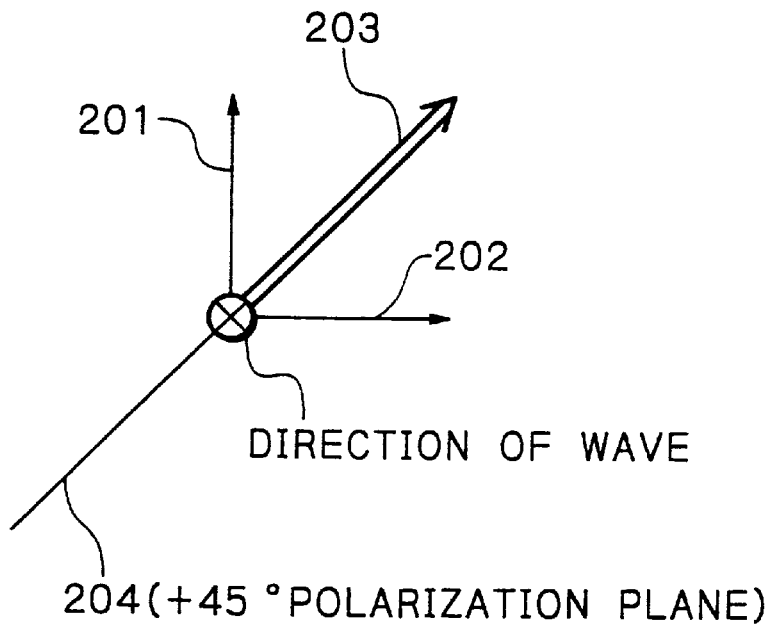
FIGS. 4A–4D are diagrams each showing particular polarization control available with the conventional array antenna.
Figure 4B:
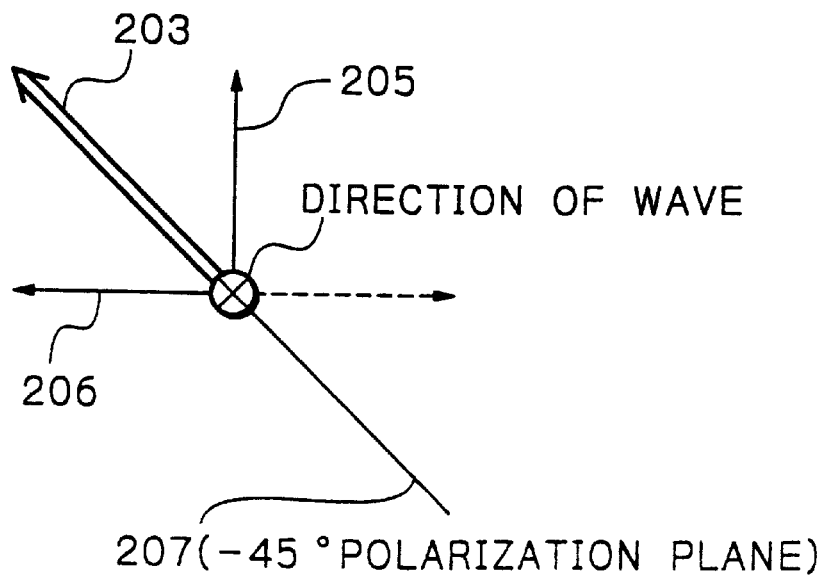
Figure 4C:
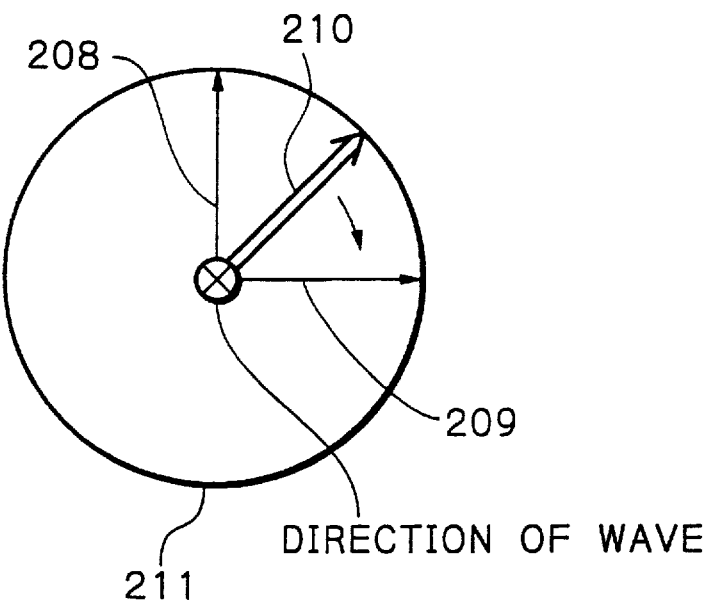
Figure 4D:
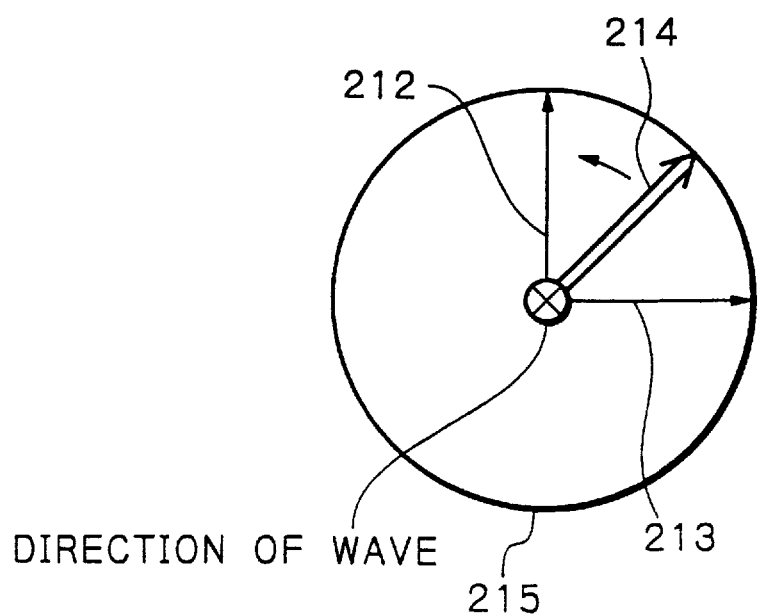

As shown in FIG. 4A, to generate a +45° linear polarization, a vertical polarization component 201 and a horizontal polarization component 202 radiated from the vertical and horizontal polarization antenna elements, respectively, are combined in the same phase. The resulting composite electric field 203 has a locus varying in a +45° polarization plane 204 with the elapse of time, implementing the +45° linear polarization. As shown in FIG. 4B, to generate a -45° linear polarization, a vertical polarization component 205 and a horizontal polarization component 206 are combined in the opposite phase, causing the locus of the composite electric field 203 to vary in a -45° polarization plane 207. As shown in FIG. 4C, when the phase of a horizontal polarization component 209 is combined with a vertical polarization component 208 while being delayed in phase by 90°, the resulting composite electric field vector 210 has a locus 211 varying along a clockwise circle with the elapse of time. This implements a right hand circular polarization. Further, as shown in FIG. 4D, when a horizontal polarization component 213 is combined with a vertical polarization component 212 while being advanced by 90°, the resulting component electric field vector 214 has a locus 215 varying along a counterclockwise circle with the elapse of time. This implements a left hand circular polarization.

As stated above, the conventional array antenna is capable of scanning a beam to be transmitted and control polarization if the phase shifter of each transmission/receipt module is provided with an adequate amount of phase shift. Further, the array antenna is capable of forming even a low sidelobe beam or a null beam difficult to form by the simple variation of the amount of phase shift. This can be done by turning off the power amplifier of a particular transmission/receipt module and reducing the transmission amplitudes of particular antenna elements to zero, i.e., reducing the number of antenna elements.

Figure 1:
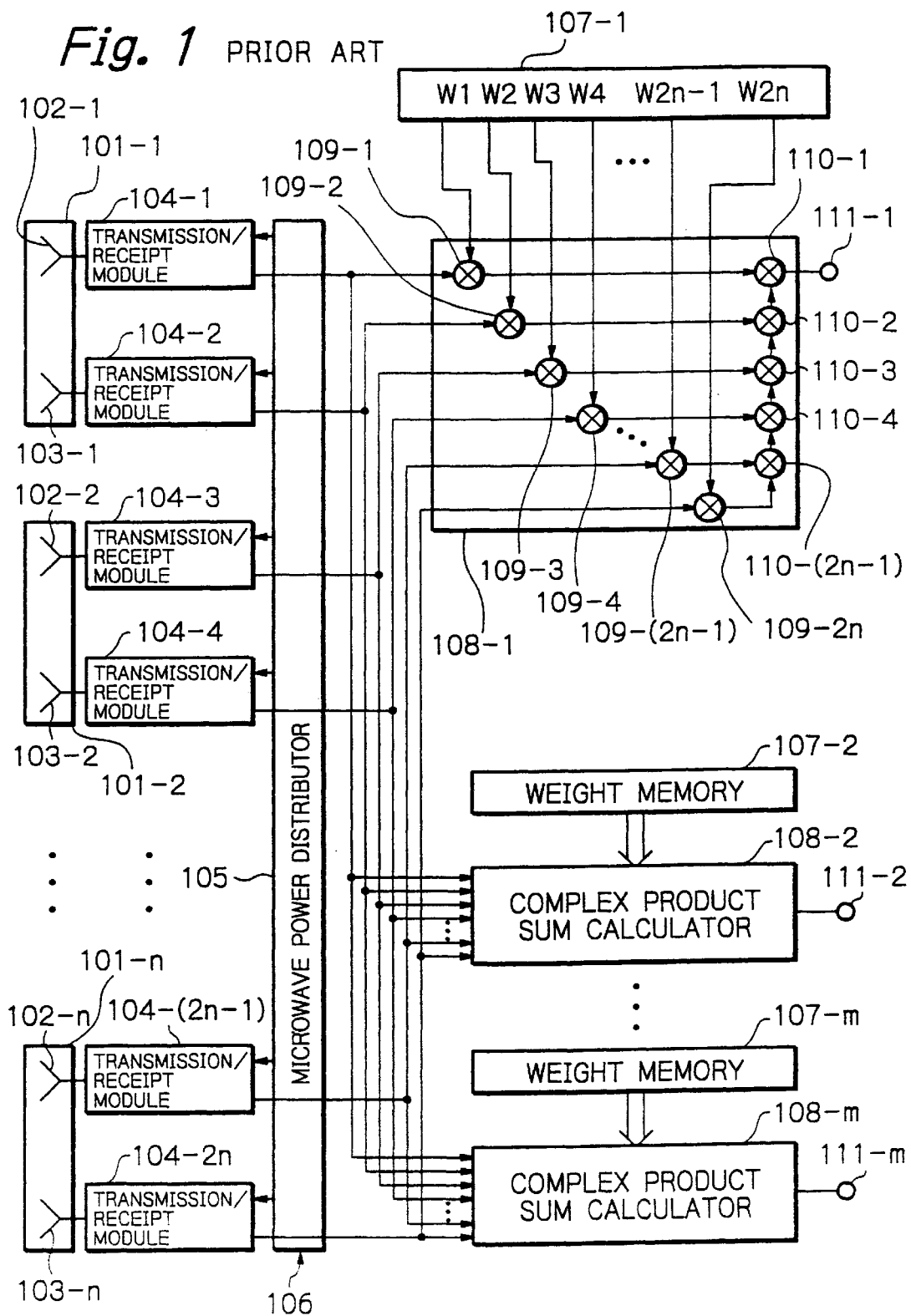
FIG. 1 is a block diagram schematically showing a conventional array antenna.

During receipt, a signal received via any one of the vertical polarization antenna elements 102-1 through 102-n and horizontal polarization antenna elements 103-1 through 103-n, FIG. 1, is routed through the circulator 114, low-noise amplifier 116 and mixers 117 and 120, FIG. 2, and transformed to a receipt video signal thereby. The receipt video signal is converted to a digital signal by the ADC 121 and then delivered to the complex product sum calculators 108-1 through 108-m, FIG. 1, in the form of receipt digital I/Q data 122. The calculators 108-1 through 108-m each produce a complex product sum of weight data W1 through W2n stored in associated one of the weight memories 107-1 through 107-m and the received digital I/Q data output from the transmission/receipt modules 104-1 through 104-2n, thereby forming a digital beam. The weight data W1 through W2n each are produced by:

$$WN = WO \cdot WN' \qquad \text{Eq. (2)}$$

where N is one of 1 through 2n, WO is a basic weight for determining the profile and direction of a received beam, and WN' is a weight for polarization control. As for the weight WN', a weight W'2n-1 (n=1, 2, ..., n) for the vertical polarization antenna element and a weight W'2n (n=1, 2, ..., n) for the horizontal polarization antenna element are expressed as:

$$W2n-1 = \exp(j\phi EL) \quad \text{Eq. (3)}$$

$$W2n = \exp(j\phi AZ) \quad \text{Eq. (4)}$$

In the above Eqs. (3) and (4), φEL and φAZ respectively correspond to the values of φEL and φAZ shown in FIG. 3. For example, to select the +45° polarization for a received beam, φEL and φAZ both are made zero. It is to be noted that a zero receipt weight corresponds to "transmission OFF" shown in FIG. 3. For example, a receipt weight for selecting the vertical polarization for the receipt polarization is W'N= ej0=1 for the vertical polarization antenna element and W'N=0 for the horizontal polarization antenna element.

The conventional array antenna with the m pairs of complex product sum calculators 108 and weight memories 107 is capable of forming m different received beams each being based on a particular polarization weight and a basic weight, i.e., multibeams of various polarizations. However, the conventional array antenna have some problems left unsolved, as discussed earlier.

Figure 5:
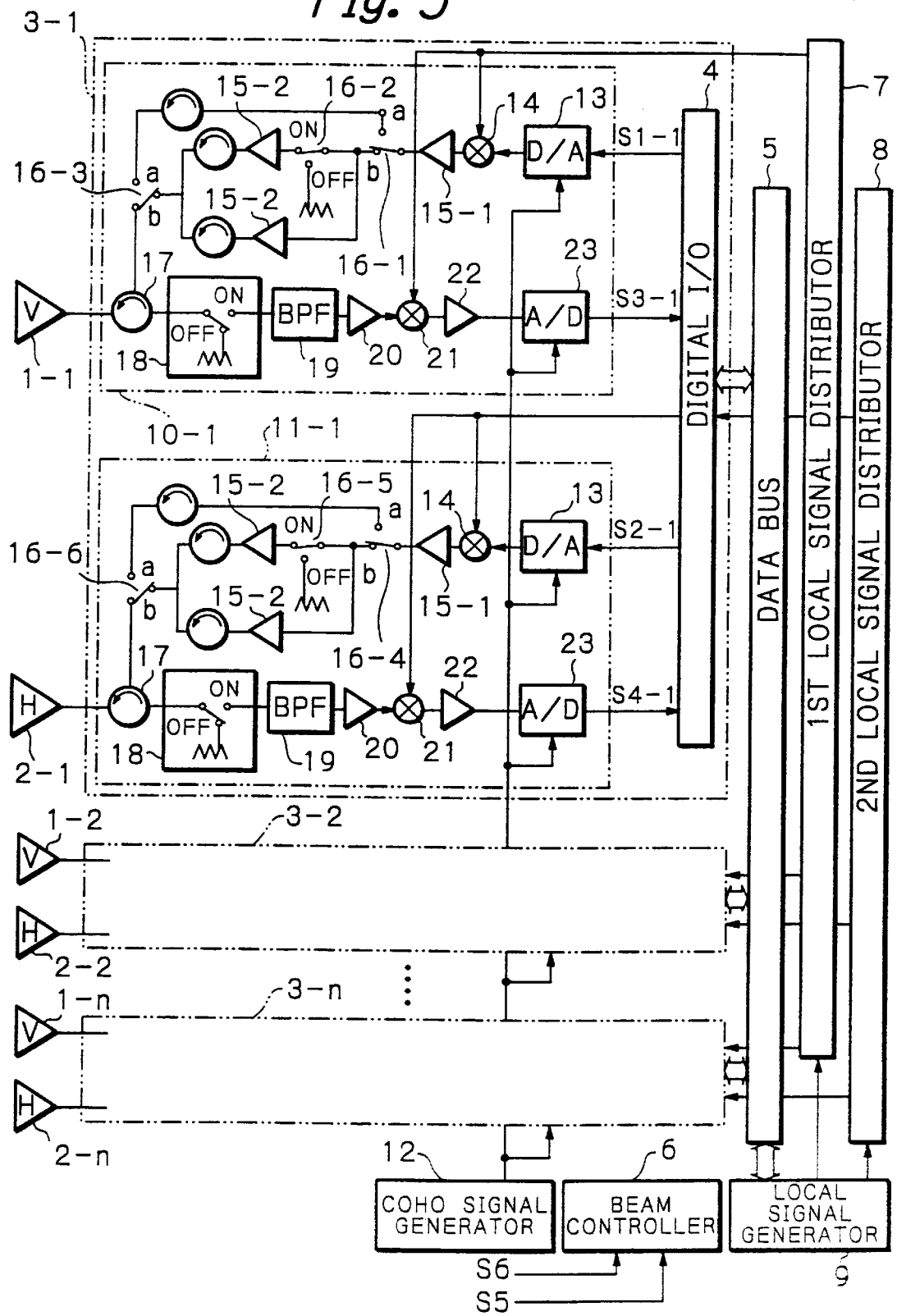
FIG. 5 is a schematic block diagram showing an array antenna embodying the present invention.

Referring to FIG. 5, an array antenna embodying the present invention will be described. As shown, the array antenna includes orthogonal polarization antennas respectively implemented by pairs of vertical polarization antenna elements 1-1 through 1-n and horizontal polarization antenna elements 2-1 through 2-n. Transmission/receipt modules 3-1 through 3-n each are connected to particular one of such orthogonal polarization antenna pairs. In the illustrative embodiment, a beam controller 6 forms a transmission/receipt digital while a local signal generator 9 controls the frequency of a transmission/receipt signal. The transmission/receipt modules 3-1 through 3-n each include a digital I/O (Input/Output) 4. The beam controller 6 is connected to each of the transmission/receipt modules 3-1 through 3-n via a data bus 5 and the digital I/O 4 of the module. The local signal generator 9 is connected to the transmission/receipt modules 3-1 through 3-n via a first local signal distributor 7 or a second local signal distributor 8.

The transmission/receipt module 3-1 includes, in addition to the digital I/O 4, a vertical and a horizontal polarization transmission/receipt circuit 10-1 and 11-1 identical in configuration. The module 3-1 interchanges digital I/Q signals S1-1, S2-1, S3-1 and S4-1 with the beam controller 6 via the digital I/O 4 thereof and data bus 5. The module 3-1 is made up of a transmitting section and a receiving section. The other modules 3-2 through 3-n are identical in configuration with the module 3-1 except for the substitution of vertical polarization transmission/receipt circuits 10-2 through 10-n for the above circuit 10-1 and substitution of horizontal polarization transmission/receipt circuits 11-2 through 11-n for the circuit 11-1 although not shown specifically.

In the transmitting sections of the transmission/receipt circuits 10-1 and 11-1, digital-to-analog converters (DAC) 13 each transform digital I/Q data S1-1 or S2-1, respectively, to an analog signal, modulate the analog signal with a COHO signal output from a COHO signal generator 12, and thereby output an IF signal to be transmitted. An up-converter 14 converts the frequency of the IF signal to that of an RF signal to be transmitted. C class power amplifiers 15-1 and 15-2 each amplify the power of the RF signal. Switches 16-1 through 16-3 and switches 16-4 through 16-6 selectively switch the outputs of the C class amplifiers 15-1 and 15-2. The transmission sections each additionally include a transmission/receipt switch 17.

In the receiving section of each of the above transmission/receipt circuits 10-1 and 11-1, a receipt gate 18 renders an RF signal input via the antenna element 1-1 or 2-1 and the switch 17 ON (conductive) or OFF (nonconductive). A band-pass filter 19 removes needless frequencies. A low-noise amplifier 20 amplifies the power of a received RF signal. A down-converter 21 converts the frequency of a received RF signal to that of an IF signal. An IF amplifier 22 amplifies a received IF signal. An ADC 23 detects the phase of a received IF signal by using the COHO signal and delivers the resulting digital I/Q data to the digital I/O 4.

The above configurations of the transmitting section and receiving section also apply to the other transmission/receipt circuits 10-2 through 10-n and 11-2 through 11-n. There are also shown in FIG. 5 a switch setting trigger S5 and a transmission trigger S6.

Figure 6:
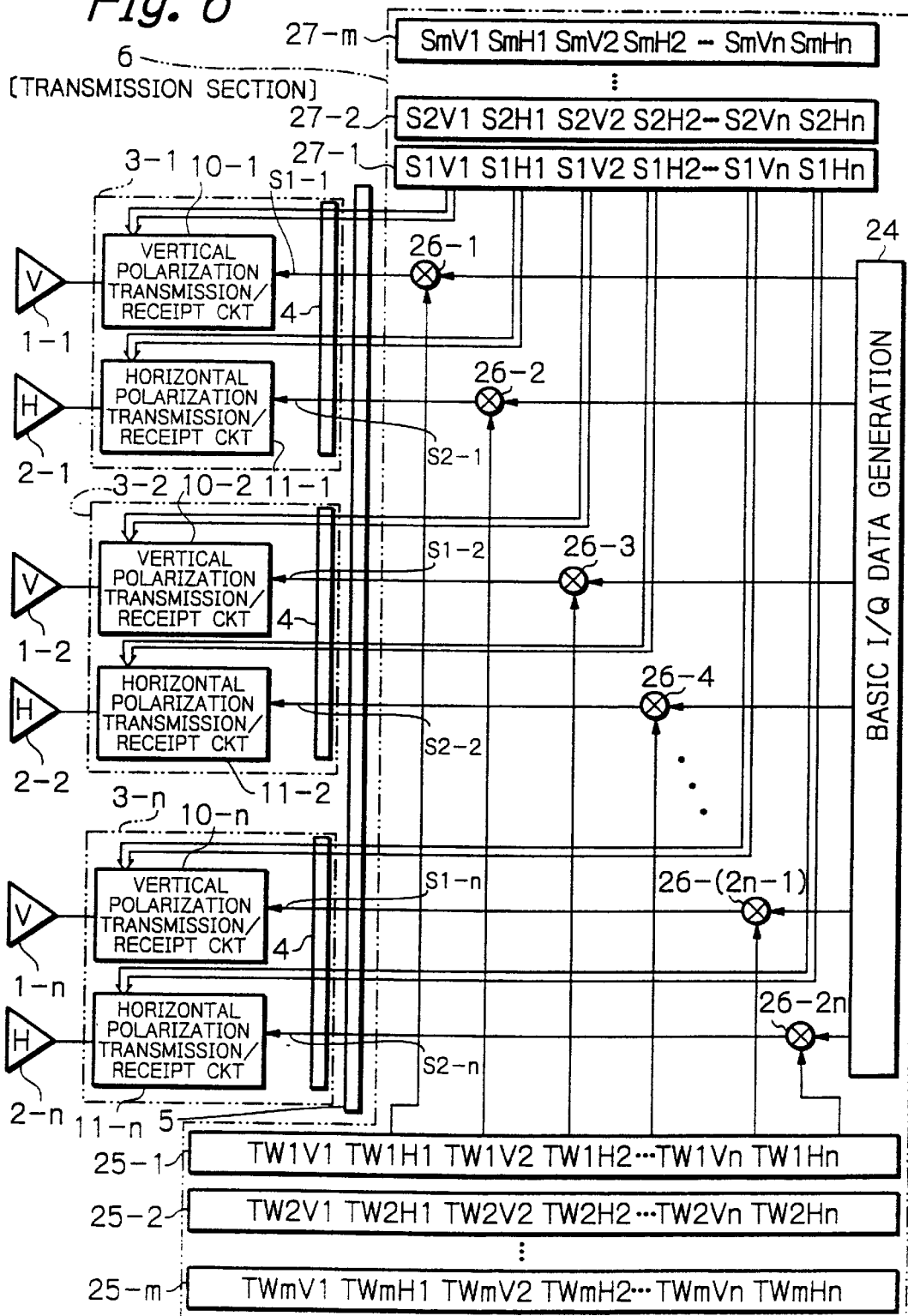
FIG. 6 is a schematic block diagram showing a specific configuration of a transmitting section included in abeam controller of the illustrative embodiment.

FIG. 6 shows part of a specific configuration of the beam controller 6 for generating digital I/Q data to be transmitted (transmitting section). As shown, the above part or transmitting section includes a basic I/Q data generation 24 for generating basic digital I/Q data having the same amplitude and phase and distributing them to all of the antenna elements 1-1 through 1-n and 2-1 through 2-n. A transmission weight memory 25-1 stores transmission weights TW1V1 through TW1Hn (TWmVn through TWmHn) relating to phases to be given to the antenna elements and determined by the profiles of beams and polarizations to be transmitted. Likewise, transmission weight memories 25-2 through 25-m each store transmission weights TWmVn through TWmHn. Complex integrators 26-1 through 26-2n each integrate the basic digital I/Q data and particular one of the above weights, thereby generating transmission digital I/Q data (S1-1 through S2-1, FIG. 5). In FIG. 6, suffixes V and H added to the weights TWmVn and TWMHn respectively correspond to weights for vertical polarization and weights for horizontal polarization. Also, n are representative of the number n assigned to each of the antenna elements 1-1 through 1-n and 2-1 through 2-n while m is representative of the number m assigned to each of the transmission weight memories 25-1 through 25-m.

Switch data memories 27-1 through 27-m store control data SmVn through SmHn for operating switches (16-1 through 16-6, FIG. 5) used to control the transmission amplitudes of the antenna elements 1-1 through 1-n and 2-1 through 2-n. In the illustrative embodiment, during transmission, the aperture distribution of the array antenna is determined by the control data SmVn through SmHn and weights TWmVn through TWmHn.

Figure 7:
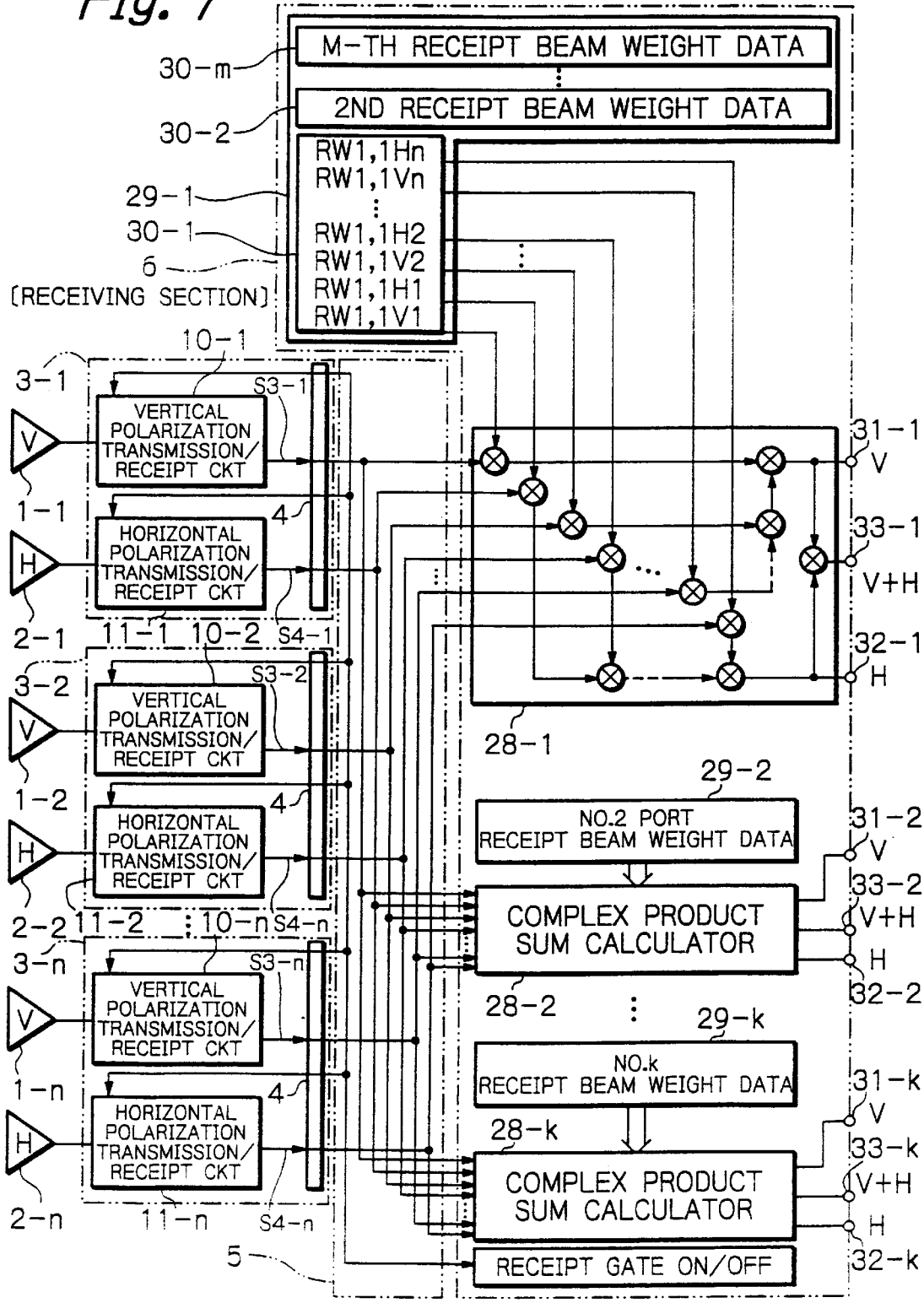
FIG. 7 is a schematic block diagram showing a receiving section also included in the beam controller.

FIG. 7 shows the other part of the beam controller 6 for executing DBF (receiving section). As shown, receipt digital I/Q data S3-1 through S3-n and S4-1 through S4-n output from the transmission/receipt modules 3-1 through 3-n are input to a plurality of complex product sum calculators 28-1 through 28-k in parallel. The configuration shown in FIG. 7 is identical with the conventional configuration of FIG. 1 in that receipt weight memories 19-1 through 19-k for executing receipt DBF each are connected to a particular complex calculator.

The difference is that in the illustrative embodiment the complex product sum calculators 28-1 through 28-k each produce a complex product sum with each of the receipt digital I/Q data S3-1 through S3-n output from the vertical polarization transmission/receipt circuits 10-1 through 10-n and the receipt digital I/Q data S4-1 through S4-n output from the horizontal polarization transmission/receipt circuits 11-1 through 11-n. As a result, each of the calculators 28-1 through 28-k outputs particular received DBF data for each of the vertical polarization and horizontal polarization, while combining the resulting data of opposite polarizations.

Consequently, each calculator outputs three different received outputs at the same time, i.e., a vertical polarization, a horizontal polarization and a composite polarization thereof.

A specific operation of the illustrative embodiment will be described hereinafter. First, reference will be made to FIGS. 5 and 6 for describing an operation to occur during transmission. The beam controller 6, FIG. 5, generates transmission digital I/Q data for driving the antenna elements 1-1 through 1-n and 2-1 through 2-n. The I/Q data are respectively transferred to the transmission/receipt modules 2-1 through 3-n via the data bus 5. In each of the vertical polarization transmission/receipt circuits 10-1 through 10-n and horizontal polarization transmission/receipt circuits 11-1 through 11-n, the digital I/Q data is transformed to an analog signal, converted in frequency, amplified in power and then radiated to the space via associated one of the antenna elements 1-1 through 1-n and 2-n through 2-n. This is the transmission DBF for forming a beam to be transmitted.

The generation of the digital I/Q data to be transmitted will be described more specifically with reference to FIG. 6. The basic I/Q data generation 24 generates basic I/Q data, e.g., a chirp signal to be evenly applied to all of the antenna elements 1-1 through 1-n and 2-1 through 2-n. The complex calculators 26-1 through 26-2n each execute complex integration with the basic I/Q data and desired one of the weight data stored in the transmission weight memories 25-1 through 25-m for forming a desired transmission beam. The resulting digital I/Q data with the desired transmission weight is output from the calculator to the data bus 5. Because the specific configuration shown in FIG. 6 includes m transmission weight memories, beams based on m different combinations of vertical and horizontal polarizations can be formed and sent by time division.

The transmission weight data TWmVn and TWmHn (m and n being numbers respectively attached to a transmission weight memory and an antenna element) are expressed as:

$$TWmVn = TWmVOn \cdot TWmVPn \quad \text{Eq. (5)}$$

$$TWmHn = TWmHOn \cdot TWmVPn \quad \text{Eq. (6)}$$

where TWmVOn and TWmHOn denote basic weights relating to a phase and respectively determining the profile and direction of beams of the vertical polarization antenna element array and those of beams of the horizontal polarization antenna element array. Specifically, when different beams are sent from the vertical and horizontal polarization antenna arrays at the same time, the weights TWmOn and TWmHOn are different from each other. When identical beams are formed by the two different arrays, the weights TWmOn and TWmHOn are identical with each other. TWmVPn and TWmHPn are weights for combining the vertical and horizontal polarizations to thereby control a transmission polarization. FIG. 8 shows specific values of TWmVPn and TWmHPn for implementing typical polarizations.

However, as for polarization s other than the vertical and horizontal polarizations, it is necessary for the vertical and horizontal antenna arrays to form identical beams. More specifically, it is necessary that the weights TWmVOn and TWmHOn assigned to the polarization antenna elements having the same element number be the same, and that the switch control data SmVOn and SmHOn for amplitude control be the same as each other. In addition, it is necessary that the vertical polarization antenna elements 1-1 through 1-n and horizontal polarization antenna elements 2-1 through 2-n be substantially identical as to the element characteristic of an orthogonal polarization antenna.

The digital I/Q data S1-1 through S1-n and S2-1 through S2-n output from the beam controller 6 by the above procedure are respectively input to the transmission/receipt modules 3-1 through 3-n via the data bus 5.

The flow of signals in the transmission/receipt modules 3-1 through 3-n is as follows. The transmission digital I/Q data S1-1 through S1-n for the vertical polarization antenna elements are input to the vertical polarization transmission/receipt circuits 10-1 through 10-n, respectively. On the other hand, the transmission digital I/Q data S2-1 through S2-n for the horizontal polarization antenna elements are input to the horizontal polarization transmission/receipt circuits 11-1 through 11-n, respectively. In each of the transmission/receipt circuits, the digital I/Q data is transformed to analog data by the DAC 13, FIG. 5, and then modulated by the COHO signal output from the COHO signal generator 12 to become an IF signal to be sent.

The IF signals respectively meant for the vertical polarization antenna element and horizontal polarization antenna elements each are converted in frequency to an RF signal by the associated up-converter 14 on the basis of a local signal received from the local signal generator 9 via the local signal distributor 7 or 8. When the horizontal and vertical polarization signals should be combined and sent for, e.g., transmission polarization control, the local signal generator 9 feeds to the two local signal distributors 7 and 8 a local signal output from a single signal source and having a single frequency. This is successful to equalize the transmission frequencies of the antenna elements 1-1 through 1-n and 2-1 through 2-n. When a particular transmission frequency should be assigned to each of the antennas 1-1 through 1-n and 2-1 through 2-n, the local signal generator 9 feeds a local signal of particular frequency to each of the local signal distributors 7 and 8.

In each of the transmission/receipt circuits 10-1 through 10-n and 11-1 through 11-n, the RF signal to be transmitted is amplified in power by the C class amplifier 15-1, routed through the transmitting section having been switched in a preselected manner and adjusted in power thereby, and then radiated to the space via the transmission/receipt switch 17 and antenna element. The "transmitting section switched in a preselected manner" refers to the following condition. Before the beam controller 6 generates and delivers the digital I/Q data S1-1 through S1-n and S2-1 through S2-n, the switch control data SmVn and SmHn (m and n being respectively a switch data memory number and an antenna element number) are fed to the switches 16-1 through 16-3 or 16-4 through 16-6 for switching the transmitting section in order to control the transmission amplitude of the associated antenna element. In the specific configuration shown in FIG. 5, the switches 16-1 through 16-6 may be operated to control the transmission amplitude of each antenna element in four consecutive steps, as shown in FIG. 9.

In the illustrative embodiment, the final aperture distribution of the array for transmission DBF is determined by the combination of the weight data stored in the transmission weight memories 25-1 through 25-m and control data fed to the switches 16-1 through 16-6. Basically, therefore, the necessary number of switch data memories 27-1 through 27-m is equal to the number of transmission weight memories 25-1 through 25-m.

A receipt procedure particular to the illustrative embodiment will be described with reference to FIGS. 5 and 7. The beam controller 6 maintains the receipt gate 18 of each transmission/receipt module in its ON state during transmission or maintains it in its OFF state during receipt. RF signals received by the antenna elements each are amplified in power, converted in frequency, detected in phase, and then transformed to digital data in the associated module, as in the conventional configuration of FIG. 1. Such digital data are fed from the modules to the complex product sum calculators 28-1 through 28-k of the beam controller 6 as receipt digital I/Q data S3-1 through S3-n and S4-1 through S4-n via the data bus 5. As a result, receipt DBF processing is executed.

The illustrative embodiment differs from the configuration of FIG. 1, as follows. The complex product sum calculators 28-1 through 28-k each execute product sum calculation with each of the received digital I/Q data derived from the vertical polarization antenna element and the received signal IQ data derived from the horizontal polarization antenna element and then combines the vertical polarization and horizontal polarization received data. Consequently, three different outputs respectively appear on the V ports 31-1 through 31-k, H ports 32-1 through 32-k and V+H ports 33-1 through 33-k which are the output ports of the complex product sum calculators 28-1 through 28-k. This triples the number of receipt beams which can be formed at the same time, compared to the conventional configuration.

No. 1 port receipt beam weight data 29-1 through No. k port receipt beam weight data 29-1 through 29-k, respectively, are implemented by, e.g., memories and respectively store receipt beam weight data 30-1 through 30-m for forming various receipt beams by time division.

Paying attention to, e.g., the No. k port, m-th receipt beam weight data, receipt beam weight data RWk and mVn for the vertical polarization antenna element and receipt beam weight data RWk and mHn for the horizontal polarization antenna element are produced by:

$$RWk, mVn = RWk, mVOn \cdot RWk, mVPn \quad \text{Eq. (7)}$$

$$RWk, mHn = RWk, mHOn \cdot RWk, mHPn \quad \text{Eq. (8)}$$

where n denotes an antenna element number, RWk, mVOn and RW, mHOn each denote a basic weight having a phase term and an amplitude term determining the profile and direction of a receipt beam, and RWk, mVPn and RWk, mHPn denote weights for controlling the polarization of a receipt beam output from the V+H ports 33-1 through 33-k.

As far as the combination of vertical and horizontal polarizations is concerned, the receipt procedure is exactly the same as the transmission procedure. Therefore, the weights for receipt polarization control are identical with the weights for transmission polarization control listed in FIG. 8.

Figure 10:
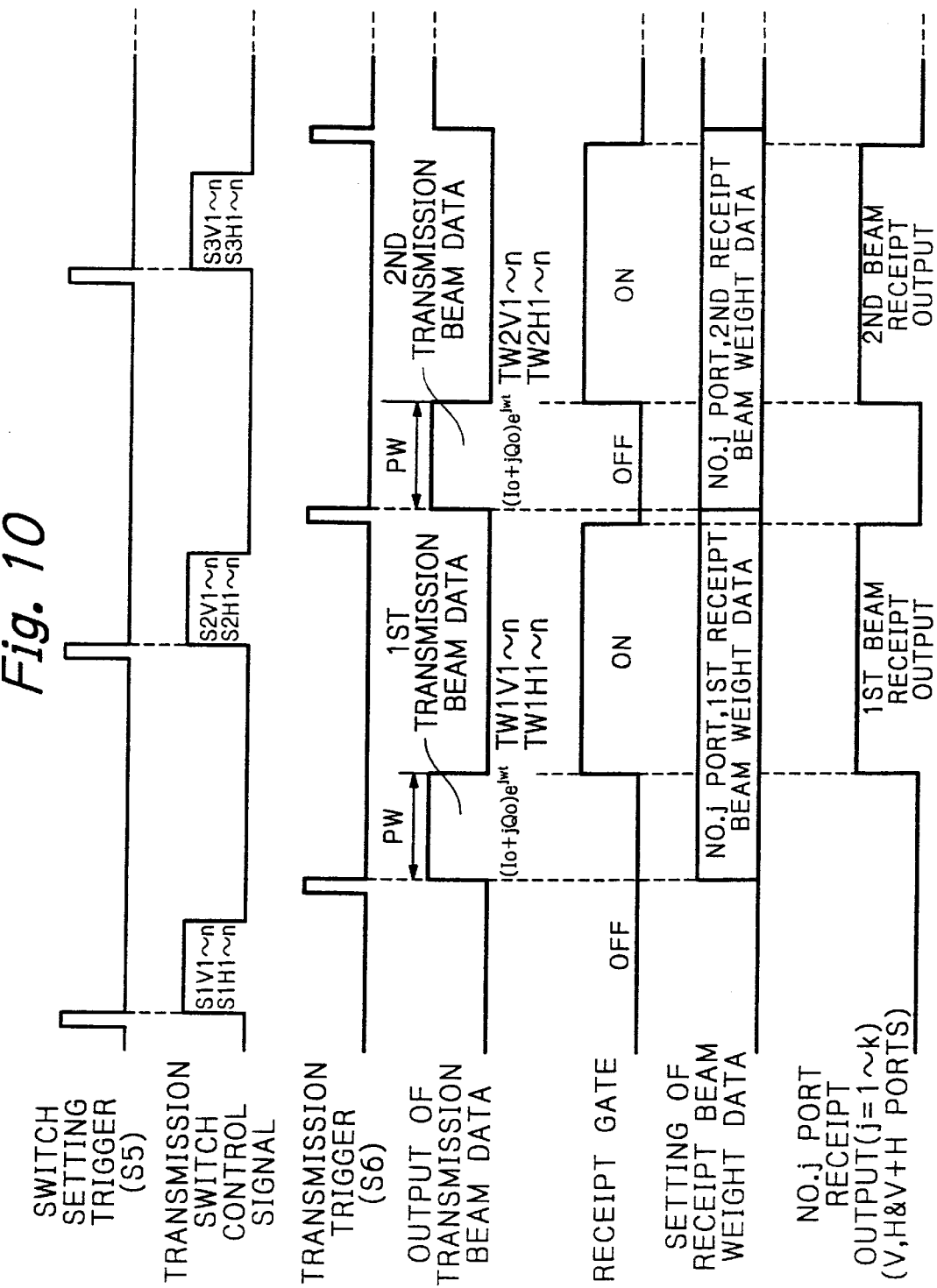
FIG. 10 is a timing chart showing a specific operation of the illustrative embodiment.

FIG. 10 shows a specific operation of the above embodiment applied to a radar. As shown, the switch setting trigger S5 is applied to the beam controller 6 in accordance with a system timing particular to the radar. In response, the beam controller 6 delivers from the switch data memory 27-1 switch control signals for controlling the transmission amplitudes of the antenna elements. The switch control signals correspond to first transmission beamdata. As a result, the beam controller 6 switches the switches 16-1 through 16-6 of the transmission/receipt modules 3-1 through 3-n before it receives a transmission trigger S6 also based on the system timing.

In response to the transmission trigger S6, the basic I/Q data generation 24 of the beam controller 6 continuously outputs digital chirp data, or basic digital I/Q data, over a period of time PW (transmission pulse width). The complex integrators 26-1 through 26-n each instantaneously execute complex integration with the above chirp data and preselected one of first transmission beam data TW1V1 through TW1Vn and TW1H1 through TW1Hn, thereby outputting transmission digital I/Q data. The transmission digital I/Q data output form the complex integrators 26-1 through 26-n are respectively fed to the transmission/receipt modules 3-1 through 3-n and then radiated in the form of a first transmission beam.

While outputting the above first transmission beam data, the beam controller 6 selects first receipt beam weight data 30-1 out of each of the No. 1 through No. k port receipt beam weight data 29-1 through 29-k. With the first receipt beam weight data 30-1, the beam controller 6 prepares the receiving system for the receipt of an echo from a target which is expected to receive the first transmission beam.

On completing the output of the first transmission beam data, i.e., transmission, the beam controller 6 delivers a receipt gate ON signal to the receipt gates 18 of the transmission/receipt modules 3-1 through 3-n, FIG. 5. As a result, receipt DBF processing is executed with signals received via the antenna elements by using the first receipt beam weight data 30-1. More specifically, for the first transmission beam, k×3 (V, H and V+H ports) different receipt outputs are produced at the same time in the form of an echo.

When the next switch setting trigger S5 is input to the beam controller 6 during the receipt of the first beam, the beam controller 6 delivers to the switches 16-1 through 16-6 switch control signals S2V1 through S2Vn and S2H1 through S2Hn corresponding to second transmission beam data. In this manner, the radiation of a transmission beam based on the plurality of sets of transmission beam weight data and switch control data and the formation of a receipt beam corresponding to the transmission beam are repeated.

Figure 11A:
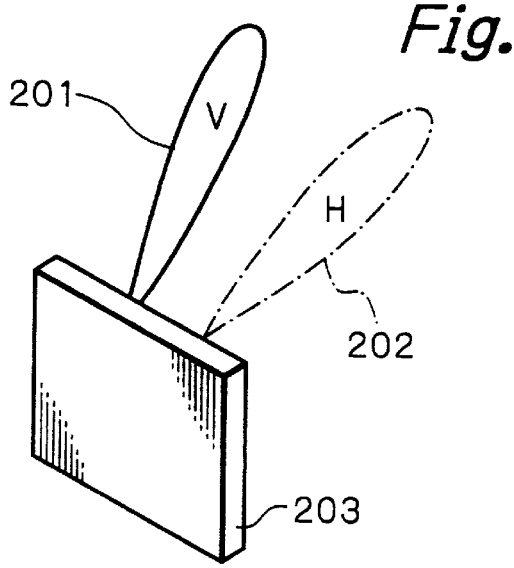
FIGS. 11A–11C are views each showing a particular transmission/receipt beam formation mode available with the illustrative embodiment.
Figure 11B:
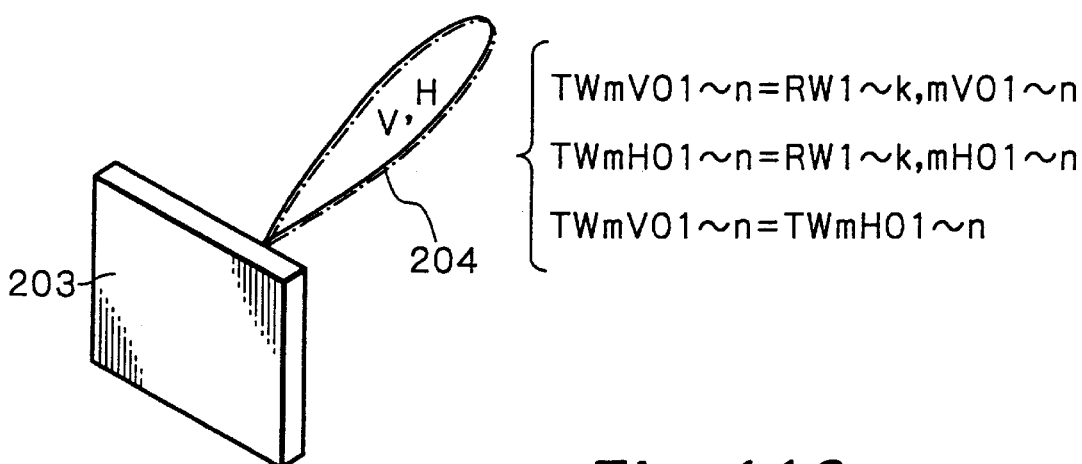
Figure 11C:
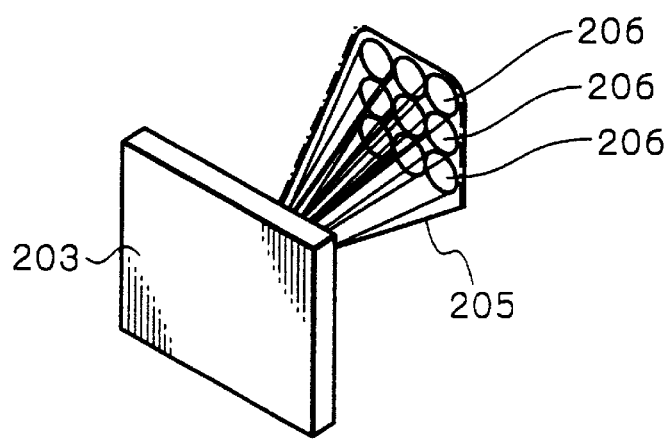

Reference will be made to FIGS. 11A–11C for describing specific modes of transmission/receipt beam formation available with a radar to which the above embodiment is applied. In FIGS. 11A–11C, the reference numeral 203 designates an array antenna representative of the illustrative embodiment. In FIG. 11A, particular weight data are assigned to each of vertical polarization and horizontal polarization. This allows a vertical polarization beam 201 and a horizontal polarization beam 202 to be transmitted and received in different directions from each other. The two polarizations can therefore be used for a search independently of each other.

In FIG. 11B, the basic weights TWmVn and TWmH for the vertical and horizontal polarization beams, respectively, are identical, so that transmission/receipt beams 204 are identical in direction and profile. During transmission, the vertical and horizontal polarizations are combined. During receipt, a plurality of receipt polarization control weights are used to receive multiple polarizations at the same time for a single transmission.

Further, in FIG. 11C, a composite vertical and horizontal polarization beam 205 is formed during transmission. During receipt, receipt multiple beams 206 are formed by finely dividing the radiation range of the composite beam 205. In this case, for a single transmission, echoes can be received from many directions equal in number to the prepared receipt beams. It is therefore possible to complete a short-range search in a short period of time.

The specific beam forming modes shown in FIGS. 11A–11C are available even with the conventional array antenna of FIG. 1. However, the illustrative embodiment effecting transmission DBF and transmission amplitude control is capable of forming a necessary beam more surely than the conventional array antenna, particularly during transmission. In addition, the illustrative embodiment is capable of controlling the transmission/receipt frequency polarization by polarization and therefore reducing interference between polarizations, particularly in the mode shown in FIG. 11A.

An alternative embodiment of the present invention will be described with reference to FIG. 12. This embodiment is identical with the previous embodiment except for the following. As shown, the transmitting sections of the transmission/receipt circuits 10-1 and 11-1 for polarization lack the switches 16-1 through 16-6 and C class power amplifiers 15-2 used for transmission amplitude control in the previous embodiment. The transmitting sections each include an amplifier 34 which is not a C class amplifier, but an A class amplifier.

Figure 13:
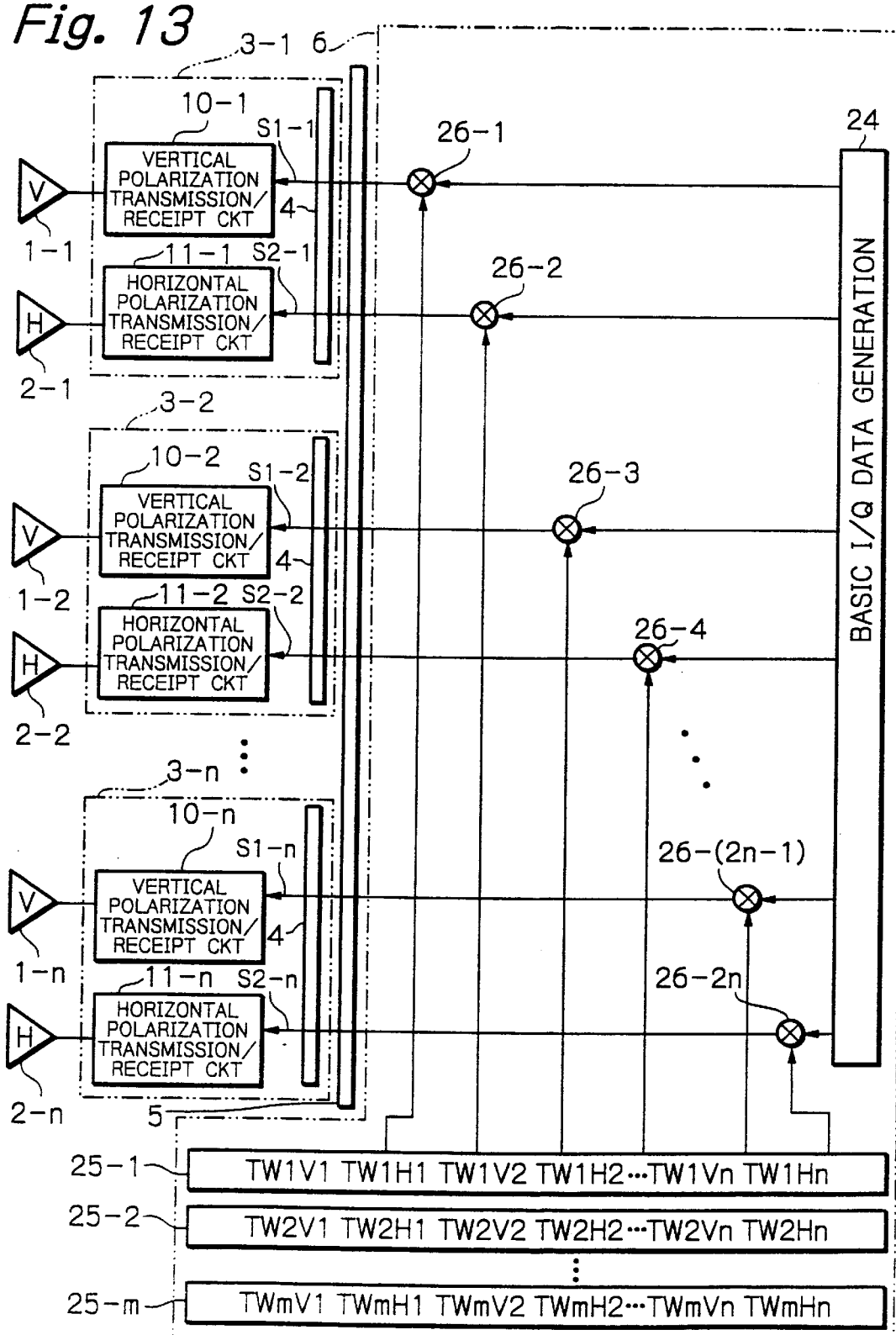
FIG. 13 is a schematic block diagram showing a transmitting section included in a beam controller of the alternative embodiment.

In this embodiment, the beam controller 6 has a transmitting section configured as shown in FIG. 13. As shown, the transmitting section does not need the switch data memories 27-1 through 27-m, FIG. 6, and wirings associated therewith. In the configuration shown in FIG. 13, the basic terms of the transmission weight data TWmVn and TWmHn for determining the profile and direction of a beam each include not only a phase term but also an amplitude term.

Figure 12:
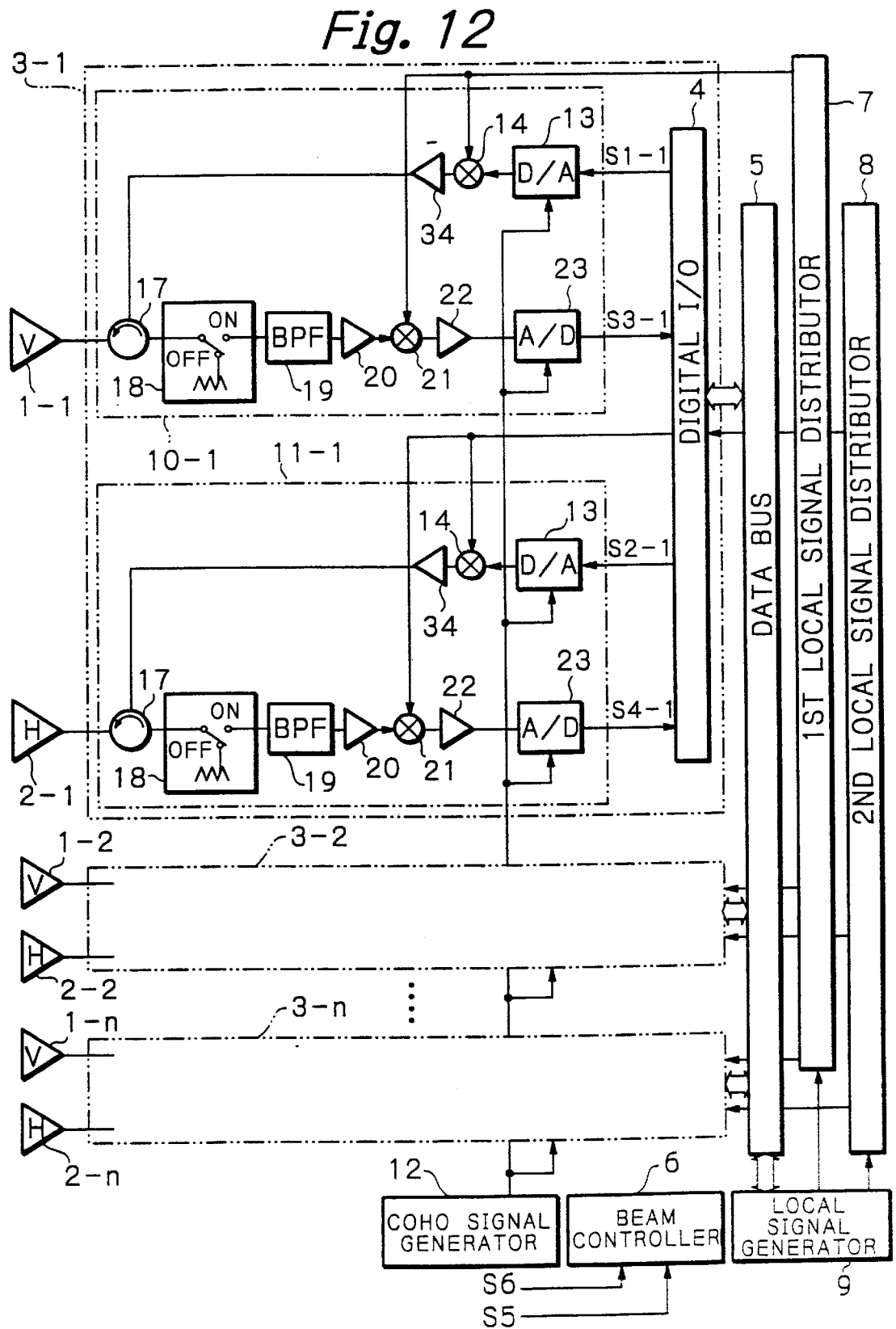
FIG. 12 is a schematic block diagram showing an alternative embodiment of the present invention.

In FIG. 12, the DAC 13 included in each transmission/receipt circuit should have a sufficient dynamic range. With such DACs 13, it is possible to subject transmission digital I/Q data weighted in amplitude by the above transmission weight data antenna by antenna to faithful digital-to-analog conversion. The relation in amplitude between the antenna-by-antenna transmission signals output from the DACs 13 is maintained even after amplification effected by the A class amplifiers 34. This embodiment can therefore execute transmission amplitude control more precisely than the previous embodiment. However, the transmission amplitude control function available with this embodiment is effective only when the amplitude linearity of the A class amplifiers 34 is guaranteed. In this sense, this embodiment is useful when high power transmission is not necessary or when low frequency operation is under way.

In summary, in accordance with the present invention, an array antenna enhances the freedom of transmission beam formation. This is because transmission DBF is used to promote accurate control over phase weights, because a transmission amplitude control function is implemented by switching of switches included in the transmitting sections of transmission/receipt circuits or control over the amplitude term of transmission weights at the time of transmission DBF, and because a particular local signal frequency is assigned to each orthogonal polarization so as to control transmission/receipt frequency polarization by polarization.

Further, the array antenna of the present invention increases the number of beams to be received at the same time during receipt DBF. This is because during receipt DBF received data from vertical polarization antennas and received data from horizontal polarization antennas are subjected to calculation independently of each other, and then a composite output thereof is calculated. As a result, three different kinds of receipt results, i.e., vertical polarization, horizontal polarization and a combined vertical and horizontal polarization are output at the same time.

Various modifications will become possible for those skilled in the art after receiving the teachings of the present disclosure without departing from the scope thereof.

What is claimed is:

1. An array antenna comprising:

a plurality of antenna elements for generating orthogonal polarization;

a plurality of transmission/receipt circuits each being connected to said plurality of antenna elements and including a digital-to-analog converter and an analog-to-digital converter in a transmitting section and a receiving section, respectively;

a digital I/O (Input/Output) section for inputting or outputting a transmission/receipt digital signal for forming a transmission/receipt beam to or from said plurality of transmission/receipt circuits;

a transmission/receipt module comprising said digital I/O section and said plurality of transmission/receipt circuits;

a beam controller connected to said transmission/receipt module via a data bus for generate digital data for forming a desired transmission beam and for forming a plurality of receipt beams at the same time with a complex product sum calculator which is use to form a received beam; and transmission amplitude control means for controlling transmission amplitudes of said plurality of antenna elements.

2. An array antenna as claimed in claim 1, further comprising a local signal distributor and a local signal generator for feeding a local signal having a particular frequency for each of the orthogonal polarizations to said plurality of transmission/receipt circuits and controlling a transmission/receipt frequency polarization by polarization.

3. An array antenna as claimed in claim 1, wherein said transmission amplitude control means comprises a plurality of C class amplifiers arranged in said plurality of transmission/receipt circuits, and a plurality of switches for selectively changing a number of said C class amplifiers to be used during transmission.

4. An array antenna as claimed in claim 1, wherein said beam controller functions as said transmission amplitude control means for generating for each of said antenna elements particular transmission digital data weighted in amplitude for transmission amplitude control, and wherein said transmission/receipt module converts said transmission digital data to analog signals and then amplifies power of said analog signals with A class amplifiers.

5. An array antenna as claimed in claim 1, wherein said complex product sum calculator executes, polarization by polarization, receipt digital beam formation with signals received via said plurality of antenna elements, and then combines results of polarization-by-polarization digital beam formation to thereby output three different receipt signals respectively corresponding to the orthogonal polarizations and a composite polarization thereof.

* * * * *